US011696533B2

(12) United States Patent
Minkwitz et al.

(10) Patent No.: US 11,696,533 B2
(45) Date of Patent: Jul. 11, 2023

(54) AGRICULTURAL FILM COMPRISING A COPOLYAMIDE OF A DIAMINE, A DIMER ACID AND A LACTAM

(71) Applicant: BASF SE, Ludwigshafen am Rhein (DE)

(72) Inventors: Rolf Minkwitz, Ludwigshafen (DE); Frank Reil, Ludwigshafen (DE); Martina Schoemer, Ludwigshafen (DE); Johannes Klaus Sprafke, Ludwigshafen (DE)

(73) Assignee: BASF SE, Ludwigshafen (DE)

( * ) Notice: Subject to any disclaimer, the term of this patent is extended or adjusted under 35 U.S.C. 154(b) by 1067 days.

(21) Appl. No.: 16/332,986

(22) PCT Filed: Sep. 5, 2017

(86) PCT No.: PCT/EP2017/072223
§ 371 (c)(1),
(2) Date: Mar. 13, 2019

(87) PCT Pub. No.: WO2018/050485
PCT Pub. Date: Mar. 22, 2018

(65) Prior Publication Data
US 2019/0269075 A1    Sep. 5, 2019

(30) Foreign Application Priority Data

Sep. 14, 2016  (EP) .................... 16188745

(51) Int. Cl.
| C08G 69/14 | (2006.01) |
| A01G 9/14 | (2006.01) |
| A01G 13/02 | (2006.01) |
| B32B 27/08 | (2006.01) |
| B32B 27/34 | (2006.01) |
| C08G 69/34 | (2006.01) |
| C08G 69/36 | (2006.01) |
| C08L 77/08 | (2006.01) |

(52) U.S. Cl.
CPC ....... *A01G 9/1438* (2013.01); *A01G 13/0275* (2013.01); *B32B 27/08* (2013.01); *B32B 27/34* (2013.01); *C08G 69/14* (2013.01); *C08G 69/34* (2013.01); *C08G 69/36* (2013.01); *C08L 77/08* (2013.01); *Y02A 40/25* (2018.01)

(58) Field of Classification Search
CPC ......... C08L 77/00; C08G 69/36; C08G 69/26; C08G 69/14; C08J 2377/06
See application file for complete search history.

(56) References Cited

U.S. PATENT DOCUMENTS

| 3,784,495 | A | | 1/1974 | Sprauer | |
| 4,212,777 | A | * | 7/1980 | Goletto | C08G 69/34 |
| | | | | | 528/289 |
| 5,013,518 | A | * | 5/1991 | Nielinger | C08G 69/34 |
| | | | | | 264/331.19 |
| 5,744,570 | A | | 4/1998 | Gebben | |
| 5,989,697 | A | | 11/1999 | Gebben | |
| 11,149,124 | B2 | * | 10/2021 | Minkwitz | B65D 65/02 |
| 2003/0232962 | A1 | | 12/2003 | Scholl et al. | |
| 2006/0003176 | A1 | | 1/2006 | Scholl et al. | |
| 2011/0105967 | A1 | * | 5/2011 | Zeng | A61M 21/00 |
| | | | | | 607/57 |

FOREIGN PATENT DOCUMENTS

| EP | 0 352 562 A2 | | 1/1990 |
| EP | 1673114 A1 | | 6/2006 |
| JP | H0568708 | * | 3/1993 |
| RU | 2003134362 A | | 6/2005 |
| RU | 2533377 C1 | | 11/2014 |
| RU | 2553911 C2 | | 6/2015 |

OTHER PUBLICATIONS

Gascone et al Polyamide-Based Film as Greenhouse Covering in Soil Solarization, Proc. XXVIIIth IHC-IS on Greenhouse 2010 and Soilless Cultivation, published on Dec. 2010.*
Duan et al In-Situ Polymerization of High-Molecular Weight Nylon 66 Modified Clay Nanocomposites with Low Apparent Viscosity, Polymers 2019, 11, 510 pp. 1-12, published on Mar. 18, 2019.*
European Search Report dated Mar. 20, 2017 in Patent Application No. 16188745.0 (with English translation of categories of cited documents), 4 pages.
International Search Report dated Dec. 11, 2017 in PCT/EP2017/072223, 4 pages (English translation previously filed).
International Preliminary Report on Patentability and Written Opinion of the International Searching Authority dated Mar. 19, 2019 in PCT/EP2017/072223 filed Sep. 5, 2017 (with English translation), 15 pages.
U.S. Appl. No. 16/333,105, filed Mar. 13, 2019, Walter Goetz, et al.
U.S. Appl. No. 16/332,255, filed Mar. 11, 2019, Rolf Minkwitz, et al.
International Search Report dated Dec. 11, 2017 in PCT/EP2017/072223 filed on Sep. 5, 2017.
Panov, et al., "Modern processing methods of polymer materials Extrusion. Injection molding", Course book, Vladimir State University named after Alexander and Nikolay Stoletovs, 2013, 128 pages.
Sutagin, et al., "Chemistry and physics of polymers", Course book, Tomsk Polytechnic University, 2003, 208 pages.

\* cited by examiner

*Primary Examiner* — Gregory Listvoyb
(74) *Attorney, Agent, or Firm* — Marshall, Gerstein & Borun LLP

(57) ABSTRACT

The present invention relates to an agricultural film (AF) comprising at least one copolyamide, wherein the copolyamide has been prepared by polymerizing at least one lactam and a monomer mixture (M). The present invention further relates to a process for producing the agricultural film (AF) and to the use of the agricultural film (AF) as mulch film, as silage film, as greenhouse film or as silo film.

16 Claims, No Drawings

AGRICULTURAL FILM COMPRISING A COPOLYAMIDE OF A DIAMINE, A DIMER ACID AND A LACTAM

The present invention relates to an agricultural film (AF) comprising at least one copolyamide, wherein the copolyamide has been prepared by polymerizing at least one lactam and a monomer mixture (M). The present invention further relates to a process for producing the agricultural film (AF) and to the use of the agricultural film (AF) in the agricultural sector, for example as mulch film, as silage film, as greenhouse film or as silo film.

In the agricultural sector, agricultural films are used for more efficient and hence more resource-conserving agriculture. The amount thereof used is growing constantly, since enhancement in efficiency and better exploitation of resources is desirable. Especially polymeric materials in the form of polymer films are used as agricultural films in the agricultural sector. The use of polymer films of this kind in the agricultural sector as agricultural films is described, for example, in Elsayed M. Abdel-Bary, Handbook of Plastic Films, Rapra Technology Limited, chapter 10, Applications of Plastic Films in Agriculture, pages 263 to 284.

Agricultural films are used, for example, as covering for greenhouses, as mulch films, as silage films and, for example, as packaging for trees. Typical polymers from which the agricultural films are produced are low-density polyethylene (LDPE), ethylene-vinyl acetate (EVA) and linear low-density polyethylene (LLDPE). In addition, the use of nylon-6 (PA 6) and nylon-6/6.6 (PA 6/6.6) has been described in the literature for agricultural films.

Agricultural films should have good mechanical properties and additionally be stable under the environmental conditions under which they are used. More particularly, they have to be able to withstand mechanical stresses and be resistant to variations in temperature, high insolation, humidity, and chemicals that are used in the agricultural sector such as pesticides and fertilizers.

DIN EN 14932:2007-03 describes the requirements on thermoplastic stretch films for wrapping of bales. DIN EN 13206:2001 describes the requirements on thermoplastic covering films for use in agriculture and gardening. DIN EN 13207:2001 describes the requirements on thermoplastic silage films. Each of these DIN standards, which are of particular relevance for agricultural films, places high demands especially on the puncture resistance of the films used. Furthermore, agricultural films should not have excessive stiffness, for example in order that they can adapt well to the seed.

Currently the most commonly used agricultural films made from LDPE frequently have relatively low puncture resistance. By contrast, for example, agricultural films made from PA 6 have higher puncture resistance than agricultural films made from LDPE, but have too high a stiffness for most applications of agricultural films.

It was thus an object of the present invention to provide an agricultural film that has the disadvantages of the agricultural films described in the prior art only to a reduced degree, if at all. The agricultural film should additionally be producible in a very simple and inexpensive manner.

This object is achieved by an agricultural film (AF) comprising at least one copolyamide prepared by polymerizing the following components:
(A) 5% to 99% by weight of at least one lactam,
(B) 1% to 95% by weight of a monomer mixture (M) comprising the following components:
(B1) at least one $C_{32}$-$C_{40}$ dimer acid and
(B2) at least one $C_4$-$C_{12}$ diamine, where the percentages by weight of components (A) and (B) are each based on the sum total of the percentages by weight of components (A) and (B).

It has been found that, surprisingly, the agricultural film (AF) of the invention has high tear propagation resistance both in extrusion direction and at right angles thereto. Furthermore, the agricultural film (AF) of the invention has higher puncture resistance, especially compared to the agricultural films made from polyolefins such as LDPE and LLDPE that are frequently used in the prior art. In addition, the agricultural film (AF) of the invention has better acid resistance than the agricultural films made from PA 6 and PA 6/6.6 that are described in the prior art. The higher acid resistance in particular is of significance, since precipitation in the form of acid rain frequently hits the agricultural film (AF) and, moreover, some fertilizers and pesticides comprise acidic constituents, or acids can form from the constituents thereof.

Furthermore, the agricultural film (AF) of the invention has high transparency. It is additionally advantageous that the agricultural film (AF) of the invention is less stiff than the agricultural films (AF) described in the prior art. The agricultural film (AF) of the invention also has a low modulus of elasticity and a high puncture resistance in the dry and in the moist state.

The invention is elucidated in detail hereinafter.

Agricultural Film (AF)

According to the invention, the agricultural film (AF) comprises at least one copolyamide.

In the context of the present invention, "at least one copolyamide" is understood to mean either exactly one copolyamide or a mixture of two or more copolyamides.

The agricultural film (AF) has a thickness, for example, in the range from 0.1 µm to 1 mm, preferably a thickness in the range from 5 to 500 µm and especially preferably in the range from 20 to 100 µm.

The present invention therefore also provides an agricultural film (AF) in which the agricultural film (AF) has a thickness in the range from 0.1 µm to 1 mm.

The agricultural film (AF) may, in addition to the at least one copolyamide, comprise at least one further polymer (FP).

In the context of the present invention, "at least one further polymer (FP)" means either exactly one further polymer (FP) or a mixture of two or more further polymers (FP).

Polymers suitable as the at least one further polymer (FP) are all polymers known to those skilled in the art. It will be apparent that the at least one further polymer (FP) is different than the at least one copolyamide.

Preferably, the at least one further polymer (FP) is selected from the group consisting of polyolefins, poly (ethyl-vinyl alcohols), poly(ethyl-vinyl acetates), polyethylene terephthalates, polyvinylidene chlorides, maleic anhydride-grafted polyolefins, polyesters and ionomers. More preferably, the at least one further polymer (FP) is selected from the group consisting of polyolefins, poly(ethylene-vinyl alcohols), poly(ethylene-vinyl acetates), polyethylene terephthalates, polyvinylidene chlorides and maleic anhydride-grafted polyolefins. Most preferably, the at least one further polymer (FP) is selected from the group consisting of polyolefins, maleic anhydride-grafted polyolefins and ethyl-vinyl alcohols.

If the at least one further polymer (FP) is selected from the group consisting of polyolefins, it is preferable that, in addition, maleic anhydride-grafted polyolefins are used as at least one further polymer (FP). It is possible here that the at least one further polymer (FP) used is a mixture of polyolefins and maleic anhydride-grafted polyolefins. It is likewise possible that, when the agricultural film (AF) is a multilayer film described below, the agricultural film (AF) comprises at least one first further layer of at least one further polymer (FP), where the at least one further polymer (FP) of the first further layer is selected from the group consisting of maleic anhydride-grafted polyolefins and the agricultural film (AF) comprises at least one second further layer of at least one further polymer (FP), where the at least one further polymer (FP) of the second further layer is selected from the group consisting of polyolefins. The agricultural film (AF) in that case preferably comprises the first further layer between the first layer comprising the at least one copolyamide and the second further layer.

Polyolefins as such are known to those skilled in the art. Preferred polyolefins are polypropylene (PP), low-density polyethylene (LDPE), linear low-density polyethylene (LLDPE) and very low-density polyethylene (VLDPE).

Linear low-density polyethylene (LLDPE) is a copolymer of ethylene and at least one $C_4$-$C_8$-$\alpha$-olefin. Linear low-density polyethylene (LLDPE) features long polymer chains with short side chains. The length of the side chains in linear low-density polyethylene (LLDPE) is typically shorter than in low-density polyethylene (LDPE) and in medium-density polyethylene (MDPE). The melting point of linear low-density polyethylene (LLDPE) is preferably in the range from 110 to 130° C.; its density is in the range from 0.91 to 0.93 g/cm$^3$.

Very low-density polyethylenes (VLDPE) are copolymers of ethylene and at least one $C_4$-$C_8$-$\alpha$-olefin. They typically have a melting point in the range from 110 to 130° C. and a density in the range from 0.86 to <0.91 g/cm$^3$. The proportion of $C_4$-$C_8$-$\alpha$-olefins in VLDPE is generally higher than in LLDPE.

In the contact of the present invention, "$C_4$-$C_8$-$\alpha$-olefin" is understood to mean linear and branched, preferably linear, alkylenes having 4 to 8 carbon atoms that are unsaturated in the $\alpha$ position, i.e. have a C—C double bond in the $\alpha$ position. Examples of these are 1-butene, 1-pentene, 1-hexene, 1-heptene and 1-octene. 1-Butene, 1-hexene and 1-octene are preferred.

Preferred poly(ethylene-vinyl acetates) are copolymers of ethylene with vinyl acetate. For example, they are prepared using in the range from 82% to 99.9% by weight of ethylene and in the range from 0.1% to 18% by weight of vinyl acetate, preferably in the range from 88% to 99.9% by weight of ethylene and in the range from 0.1% to 12% by weight of vinyl acetate.

Preferred poly(ethylene-vinyl alcohols) are obtainable by complete or partial hydrolysis of the above-described poly(ethylene-vinyl acetates). For example, the poly(ethylene-vinyl alcohols) comprise in the range from 50 to 75 mol % of ethylene and in the range from 25 to 50 mol % of vinyl alcohol, based on the total molar amount of the poly(ethylene-vinyl alcohols).

The agricultural film (AF) may comprise the at least one further polymer (FP) as a blend (mixture) with the at least one copolyamide.

Furthermore, it is possible and preferable in accordance with the invention that the agricultural film (AF) comprises at least one first layer comprising the at least one copolyamide, and the agricultural film (AF) comprises at least one further layer comprising the at least one further polymer (FP).

In this embodiment, it is preferable that the at least one first layer comprising the at least one copolyamide does not comprise any further polymer (FP).

In the context of the present invention, "at least one first layer" means either exactly one first layer or two or more first layers.

In the context of the present invention, "at least one further layer" means either exactly one further layer or two or more further layers. Two or more further layers are preferred.

It is thus preferable that the agricultural film (AF) comprises at least one first layer comprising the at least one copolyamide, and the agricultural film (AF) also comprises at least one further layer, where the at least one further layer comprises at least one further polymer (FP) selected from the group consisting of polyolefins, poly(ethylene-vinyl alcohols), poly(ethylene-vinyl acetates), polyethylene terephthalates, polyvinylidene chlorides and maleic anhydride-grafted polyolefins.

The present invention thus also provides an agricultural film (AF), in which the agricultural film (AF) comprises at least one first layer comprising the at least one copolyamide, and the agricultural film (AF) comprises at least one further layer, where the at least one further layer comprises at least one further polymer (FP) selected from the group consisting of polyolefins, poly(ethylene-vinyl alcohols), poly(ethylene-vinyl acetates), polyethylene terephthalates, polyvinylidene chlorides and maleic anhydride-grafted polyolefins.

If the agricultural film (AF), apart from the at least one first layer, does not comprise any further layer, the agricultural film (AF) is also referred to as a monofilm. If the agricultural film (AF) is a monofilm, it may comprise exactly one first layer and no further layer; it is likewise possible that it comprises two or more first layers and no further layer. If the agricultural film (AF) comprises two or more first layers and is a monofilm, the two or more first layers all have the same composition.

If the agricultural film (AF) comprises at least one first layer comprising the at least one copolyamide, and at least one further layer comprising the at least one further polymer (FP), the agricultural film (AF) is also referred to as a multilayer film.

For example, the agricultural film (AF) in that case comprises 1 to 11 first layers comprising the at least one copolyamide, and 1 to 13 further layers comprising the at least one further polymer (FP). Preferably, the agricultural film (AF) comprises 1 to 5 first layers comprising the at least one copolyamide, and 1 to 11 further layers comprising the at least one further polymer (FP). Especially preferably, the agricultural film (AF) comprises 1 to 3 first layers comprising the at least one copolyamide, and 1 to 7 further layers comprising the at least one further polymer (FP).

In a preferred embodiment of the present invention, the at least one first layer consists of the at least one copolyamide. It is likewise preferable that the at least one further layer consists of the at least one further polymer (FP).

In the context of the present invention, the term "agricultural film (AF)" thus comprises both monofilms and multilayer films.

The present invention therefore also provides an agricultural film (AF), wherein the agricultural film (AF) is a monofilm or a multilayer film.

As described above, the agricultural film (AF) typically has a thickness in the range from 0.1 μm to 1 mm, preferably in the range from 5 to 500 μm and especially preferably in the range from 10 to 100 μm.

If the agricultural film (AF) is a monofilm and comprises exactly one first layer, the first layer has the same thickness as the agricultural film (AF), i.e., for example, in the range from 0.1 µm to 1 mm, preferably in the range from 5 to 500 µm and especially preferably in the range from 10 to 100 µm. If the agricultural film (AF) is a monofilm and comprises two or more first layers, the thickness of every first layer is typically less than the thickness of the agricultural film (AF). The sum total of the thicknesses of the individual first layers in that case generally corresponds to the thickness of the agricultural film (AF). For example, the at least one first layer comprising the at least one copolyamide in that case has a thickness in the range from 0.1 to 100 µm, preferably in the range from 0.5 to 50 µm and especially preferably in the range from 0.5 to 15 µm.

If the agricultural film (AF) is a multilayer film, the thickness of the individual layers of the agricultural film (AF), i.e. the thickness of the at least one first layer comprising the at least one copolyamide, and the thickness of the at least one further layer comprising the at least one further polymer (FP), is typically less than the thickness of the agricultural film (AF). The sum total of the thicknesses of the individual layers in that case generally corresponds to the thickness of the agricultural film (AF).

For example, the at least one first layer comprising the at least one copolyamide in that case has a thickness in the range from 0.1 to 100 µm, preferably in the range from 0.5 to 50 µm and especially preferably in the range from 0.5 to 15 µm.

The at least one further layer comprising the at least one further polymer (FP) in that case has a thickness, for example, in the range from 0.1 to 100 µm, preferably in the range from 0.5 to 50 µm and especially preferably in the range from 0.5 to 15 µm.

The agricultural film (AF) may comprise at least one adhesion promoter. This embodiment is preferred when the agricultural film (AF) is a multilayer film.

In the context of the present invention, "at least one adhesion promoter" means either exactly one adhesion promoter or a mixture of two or more adhesion promoters.

If the agricultural film (AF) is a multilayer film, the at least one adhesion promoter may be present together with the at least one copolyamide in the at least one first layer. It is likewise possible that the at least one adhesion promoter is present together with the at least one further polymer (FP) in the at least one further layer. Furthermore, it is possible that the at least one adhesion promoter is present as at least one additional layer in the agricultural film (AF). This embodiment is preferred.

When the at least one adhesion promoter is present as at least one additional layer in the agricultural film (AF), this at least one additional layer is preferably arranged between the at least one further layer comprising the at least one further polymer (FP), and the at least one first layer comprising the at least one copolyamide. The at least one layer of the adhesion promoter has a thickness, for example, of 0.1 to 100 µm, preferably in the range from 0.5 to 50 µm and especially preferably in the range from 0.5 to 15 µm.

Suitable adhesion promoters are known as such to the person skilled in the art. Preferred adhesion promoters are copolymers of ethylene with maleic anhydride or a copolymer of ethylene with vinyl acetate. Preference is given to a copolymer of linear low-density polyethylene (LLDPE) and maleic anhydride or a copolymer of ethylene and vinyl acetate, the copolymer being prepared using >18% by weight of vinyl acetate and <82% by weight of ethylene.

These copolymers are commercially available, for example under the Bynel 4105 trade name from DuPont or Escorene FL00119 from Exxon.

Copolymers of ethylene with maleic anhydride that are used with preference as adhesion promoters are maleic anhydride-grafted polymers or copolymers of ethylene.

The agricultural film (AF) may also comprise additives. Additives of this kind are known to those skilled in the art and are selected, for example, from the group consisting of stabilizers, dyes, antistats, tackifiers, anti-blockers, processing auxiliaries, antioxidants, light stabilizers, UV absorbers, lubricants and nucleating aids.

Suitable dyes are organic and inorganic pigments, for example titanium dioxide provided with a size. Suitable tackifiers are, for example, polyisobutylene (PIB) or ethylvinyl acetate (EVA). Suitable antiblocking agents are, for example, silicon dioxide particles or calcium carbonate particles. Suitable light stabilizers are, for example, what are called HALS (hindered amine light stabilizers). Processing auxiliaries or lubricants used may, for example, be ethylenebisstearamide (EBS) wax. Nucleating aids may, for example, be all kinds of organic or inorganic crystallization nucleators, for example talc.

The additives may either be present either in the at least one first layer or in the at least one further layer. They may be present in just one of these layers; it is likewise possible that they are present in each of these layers.

The agricultural film (AF) of the invention may be any kind of agricultural film (AF) known to those skilled in the art. Preferably, the agricultural film (AF) is a silage film, a mulch film, a greenhouse film and/or a silo film.

The present invention therefore also provides an agricultural film (AF), wherein the agricultural film (AF) is selected from silage films, mulch films, greenhouse films and silo films.

Silage films are also referred to as silage foils and serve for production and storage of silage. Silage is animal feed conserved by fermentation, especially for farm animals. Silage films must especially have high airtightness and high mechanical stability, especially high puncture resistance. High airtightness is necessary in order to ferment and hence conserve the animal feed. Mechanical stability is needed especially in order to achieve high compaction and retention of the silage material.

Mulch films are also referred to as mulch foils and are covering films for agricultural soils, especially for beds and areas under cultivation. Mulch films especially serve to suppress weed growth. Moreover, the coverage of the soil with the mulch film keeps the soil warm and at the same time causes it to dry out less significantly than without film.

Greenhouse films are also referred to as greenhouse foils. They divide the soil on which they stand from the environment and, in the isolated area, create a microclimate which makes the growth of the plants more efficient or enables it in the first place. Greenhouse films are distinguished between greenhouse covers, walk-in tunnel covers and small tunnel covers. Greenhouse films should be airtight, and also have high mechanical stability with high puncture and tear propagation resistance. High UV stability is also desirable in order to prolong the lifetime of the films.

Silo films are also referred to as silo foils or silo bags. Silo films are used for storage of harvested material or bulk material. The harvested material stored in silo films comprises, for example, foodstuffs and/or animal feeds. These include plant seeds, for example soybeans, cereal or corn, and likewise potatoes, beets and pomace. By contrast with the above-described silage which is stored in silage films, the harvested material stored in silo films is compacted to a lesser degree and typically not decomposed, for example by fermentation. The harvested material stored in the silo is therefore preferably in undecomposed form. In the context of the present invention, "essentially undecomposed" means that not more than 10% by weight, preferably not more than 5% by weight and especially preferably not more than 1% by weight of the harvested material in the silo film is decomposed, based on the total weight of the harvested material in the silo film.

The harvested material can be stored in the silo film, for example, over weeks, months or even years. The harvested material is typically stored in the silo film for a period of time in the range from 2 weeks to 2 years, preferably in the range from 4 weeks to 1.5 years and especially preferably in the range from 12 weeks to 1 year.

Silo films are preferably in tubular form and enable the storage of the harvested material outdoors as well, for example directly in the field. Silo films typically have a tube diameter in the range from 1.5 to 10 m (meters), preferably in the range from 2 to 6 m and especially preferably in the range from 2.5 to 3.5 m. the length of silo films of the invention is, for example, in the range from 2 to 250 m, preferably in the range from 5 to 200 m and especially preferably in the range from 10 to 150 m.

Silo films must especially have high airtightness, high watertightness and high UV stability. Furthermore, high mechanical stabilities are advantageous.

The present invention therefore also provides for the use of the agricultural film (AF) of the invention in the agricultural sector, for example as a silage film, mulch film, greenhouse film or silo film.

Copolyamide

According to the invention, the agricultural film (AF) comprises at least one copolyamide prepared by polymerizing the following components:
(A) 5% to 99% by weight of at least one lactam,
(B) 1% to 95% by weight of a monomer mixture (M) comprising the following components:
    (B1) at least one $C_{32}$-$C_{40}$ dimer acid and
    (B2) at least one $C_4$-$C_{12}$ diamine,
where the percentages by weight of components (A) and (B) are each based on the sum total of the percentages by weight of components (A) and (B).

The terms "component (A)" and "at least one lactam" are used synonymously in the context of the present invention and therefore have the same meaning.

The same applies to the terms "component (B)" and "a monomer mixture (M)". These terms are likewise used synonymously in the context of the present invention and therefore have the same meaning.

In the context of the present invention, "at least one lactam" means either exactly one lactam or a mixture of two or more lactams. Preference is given to exactly one lactam.

According to the invention, the at least one copolyamide has been prepared by polymerizing 5% to 99% by weight of component (A) and 1% to 95% by weight of component (B). Preferably, the at least one copolyamide has been prepared by polymerizing 40% to 90% by weight of component (A) and from 10% to 60% by weight of component (B). Especially preferably, the at least one copolyamide has been prepared by polymerizing from 60% to 80% by weight of component (A) and from 20% to 40% by weight of component (B), where the percentages by weight of components (A) and (B) are each based on the sum total of the percentages by weight of components (A) and (B).

Preferably, the sum total of the percentages by weight of components (A) and (B) adds up to 100% by weight.

It will be apparent that the percentages by weight of components (A) and (B) are based on the percentages by weight of components (A) and (B) prior to polymerization, i.e. when components (A) and (B) have not yet reacted with one another. During the polymerization, the weight ratio of components (A) and (B) may change.

According to the invention, the copolyamide is prepared by polymerizing components (A) and (B). The polymerization of components (A) and (B) is known to those skilled in the art. Typically, the polymerization of components (A) with (B) is a condensation reaction. During the condensation reaction, component (A) reacts with components (B1) and (B2) present in component (B) and with any component (B3) as described further down that may likewise be present in component (B). This forms amide bonds between the individual components. Typically, component (A) is at least partly in open-chain form during the polymerization, i.e. in the form of an amino acid.

The polymerization of components (A) and (B) may take place in the presence of a catalyst. Suitable catalysts are all catalysts that are known to those skilled in the art and catalyze the polymerization of components (A) and (B). Catalysts of this kind are known to those skilled in the art. Preferred catalysts are phosphorus compounds, for example sodium hypophosphite, phosphorous acid, triphenylphosphine or triphenyl phosphite.

The polymerization of components (A) and (B) forms the copolyamide, which therefore receives structural units derived from component (A) and structural units derived from component (B). Structural units derived from component (B) comprise structural units derived from components (B1) and (B2) and from any component (B3).

The polymerization of components (A) and (B) forms the copolyamide as the copolymer. The copolymer may be a random copolymer; it is likewise possible that it is a block copolymer.

In a block copolymer, there is formation of blocks of units derived from component (B) and of blocks of units derived from component (A). These alternate. In the case of a random copolymer, there is alternation of structural units derived from component (A) with structural units derived from component (B). This alternation is random; for example, two structural units derived from component (B) may be followed by one structural unit derived from component (A), which is in turn followed by one structural unit derived from component (B), which is then followed by a structural unit comprising three structural units derived from component (A).

Preferably, the at least one copolyamide is a random copolymer.

The present invention therefore also provides an agricultural film (AF) in which the at least one copolyamide is a random copolymer.

The preparation of the at least one copolyamide preferably comprises the following steps:
a) polymerizing components (A) and (B) to obtain at least one first copolyamide,
b) pelletizing the at least one first copolyamide obtained in step a) to obtain at least one pelletized copolyamide,
c) extracting the at least one pelletized copolyamide obtained in step b) with water to obtain at least one extracted copolyamide,
d) drying the at least one extracted copolyamide obtained in step c) at a temperature ($T_T$) to obtain the at least one copolyamide.

The present invention therefore also provides an agricultural film (AF) in which the copolyamide is prepared in a process comprising the following steps:
a) polymerizing components (A) and (B) to obtain at least one first copolyamide,
b) pelletizing the at least one first copolyamide obtained in step a) to obtain at least one pelletized copolyamide,
c) extracting the at least one pelletized copolyamide obtained in step b) with water to obtain at least one extracted copolyamide,
d) drying the at least one extracted copolyamide obtained in step c) at a temperature ($T_T$) to obtain the at least one copolyamide.

The polymerization in step a) can take place in any reactors known to those skilled in the art. Preference is given to stirred tank reactors. It is additionally possible to use auxiliaries known to those skilled in the art to improve the reaction regime, for example defoamers such as polydimethylsiloxane (PDMS).

In step b), the at least one first copolyamide obtained in step a) can be pelletized by any methods known to those skilled in the art, for example by means of strand pelletization or underwater pelletization.

The extraction in step c) can be effected by any methods known to those skilled in the art.

During the extraction in step c), by-products that are typically formed during the polymerization of components (A) and (B) in step a) are extracted from the at least one pelletized copolyamide.

In step d), the at least one extracted copolyamide obtained in step c) is dried. Methods of drying are known to those skilled in the art. According to the invention, the at least one extracted copolyamide is dried at a temperature ($T_T$). The temperature ($T_T$) is preferably above the glass transition temperature ($T_{G(C)}$) of the at least one copolyamide and below the melting temperature ($T_{M(C)}$) of the at least one copolyamide.

The drying in step d) is typically effected for a period of time in the range from 1 to 100 hours, preferably in the range from 2 to 50 hours and especially preferably in the range from 3 to 40 hours.

It is envisaged that the drying in step d) will further increase the molecular weight of the at least one copolyamide.

The at least one copolyamide typically has a glass transition temperature ($T_{G(C)}$). The glass transition temperature ($T_{G(C)}$) is, for example, in the range from 20 to 50° C., preferably in the range from 23 to 47° C. and especially preferably in the range from 25 to 45° C., determined according to ISO 11357-2: 2014.

The present invention therefore also provides an agricultural film (AF) in which the at least one copolyamide has a glass transition temperature ($T_{G(C)}$), where the glass transition temperature ($T_{G(C)}$) is in the range from 20 to 50° C.

The glass transition temperature ($T_{G(C)}$) of the at least one copolyamide, in accordance with ISO 11357-2: 2014, in the context of the present invention, is based on the glass transition temperature ($T_{G(C)}$) of the dry copolyamide.

In the context of the present invention, "dry" means that the at least one copolyamide comprises less than 1% by weight, preferably less than 0.5% by weight and especially preferably less than 0.1% by weight of water, based on the total weight of the at least one copolyamide. More preferably, "dry" means that the at least one copolyamide does not comprise any water and most preferably that the at least one copolyamide does not comprise any solvent.

The at least one copolyamide additionally has a melting temperature ($T_{M(C)}$). The melting temperature ($T_{M(C)}$) of the at least one copolyamide is, for example, in the range from 150 to 215° C., preferably in the range from 160 to 205° C. and especially preferably in the range from 160 to 200° C., determined according to ISO 11357-3: 2014.

The present invention therefore also provides an agricultural film (AF) in which the at least one copolyamide has a melting temperature ($T_{M(C)}$), where the melting temperature ($T_{M(C)}$) is in the range from 150 to 215° C.

The at least one copolyamide generally has a viscosity number ($VN_{(C)}$) in the range from 150 to 300 mL/g, determined in a 0.5% by weight solution of the at least one copolyamide in a mixture of phenol/o-dichlorobenzene in a weight ratio of 1:1.

Preferably, the viscosity number ($VN_{(C)}$) of the at least one copolyamide is in the range from 160 to 290 mL/g and more preferably in the range from 170 to 280 mL/g, determined in a 0.5% by weight solution of the at least one copolyamide in a mixture of phenol/o-dichlorobenzene in a weight ratio of 1:1.

The present invention therefore also provides an agricultural film (AF) in which the at least one copolyamide has a viscosity number ($VN_{(C)}$) in the range from 150 to 300 mL/g, determined in a 0.5% by weight solution of the at least one copolyamide in a mixture of phenol/o-dichlorobenzene in a weight ratio of 1:1.

Component (A)

Component (A) is at least one lactam.

Lactams are known as such to those skilled in the art. Preference is given in accordance with the invention to lactams having 4 to 12 carbon atoms.

In the context of the present invention, lactams are understood to mean cyclic amides having, in the ring, preferably 4 to 12 and more preferably 5 to 8 carbon atoms.

Suitable lactams are selected, for example, from the group consisting of 3-aminopropanolactam (propio-3-lactam; β-lactam; β-propiolactam), 4-aminobutanolactam (butyro-4-lactam; γ-lactam; γ-butyrolactam), 5-aminopentanolactam (2-piperidinone; δ-lactam; δ-valerolactam), 6-aminohexanolactam (hexano-6-lactam: ε-lactam; ε-caprolactam), 7-aminoheptanolactam (heptano-7-lactam; ζ-lactam; ζ-heptanolactam), 8-aminooctanolactam (octano-8-lactam; η-lactam; η-octanolactam), 9-aminononanolactam (nonano-9-lactam; θ-lactam; θ-nonanolactam), 10-aminodecanolactam (decano-10-lactam; ω-decanolactam), 11-aminoundecanolactam (undecano-11-lactam; ω-undecanolactam) and 12-aminododecanolactam (dodecano-12-lactam; ω-dodecanolactam).

The present invention therefore also provides an agricultural film (AF) in which component (A) is selected from the group consisting of 3-aminopropanolactam, 4-aminobutanolactam, 5-aminopentanolactam, 6-aminohexanolactam, 7-aminoheptanolactam, 8-aminooctanolactam, 9-aminononanolactam, 10-aminodecanolactam, 11-aminoundecanolactam and 12-aminododecanolactam.

The lactams may be unsubstituted or at least monosubstituted. If at least monosubstituted lactams are used, these may bear, on the nitrogen atom and/or on the carbon atoms of the ring, one, two or more substituents independently selected from the group consisting of $C_1$- to $C_{10}$-alkyl, $C_5$- to $C_6$-cycloalkyl and $C_5$- to $C_{10}$-aryl.

Suitable $C_1$- to $C_{10}$-alkyl substituents are, for example, methyl, ethyl, propyl, isopropyl, n-butyl, sec-butyl and tert-butyl. An example of a suitable $C_5$- to $C_6$-cycloalkyl substituent is cyclohexyl. Preferred $C_5$- to $C_{10}$-aryl substituents are phenyl and anthranyl. Preference is given to using unsubstituted lactams, preference being given to γ-lactam (γ-butyrolactam), δ-lactam (δ-valerolactam) and ε-lactam (ε-caprolactam). Particular preference is given to δ-lactam (δ-valerolactam) and ε-lactam (ε-caprolactam), especial preference to ε-caprolactam.

Monomer Mixture (M)

According to the invention, component (B) is a monomer mixture (M). The monomer mixture (M) comprises components (B1), at least one $C_{32}$-$C_{40}$ dimer acid, and (B2) at least one $C_4$-$C_{12}$ diamine.

In the context of the present invention, a monomer mixture (M) is understood to mean a mixture of two or more monomers, where at least components (B1) and (B2) are present in the monomer mixture (M).

In the context of the present invention, the terms "component (B1)" and "at least one $C_{32}$-$C_{40}$ dimer acid" are used synonymously and therefore have the same meaning. The same applies to the terms "component (B2)" and "at least one $C_4$-$C_{12}$ diamine". These terms are likewise used synonymously in the context of the present invention and therefore have the same meaning.

The monomer mixture (M) comprises, for example, in the range from 45 to 55 mol % of component (B1) and in the range from 45 to 55 mol % of component (B2), based in each case on the sum total of the molar percentages of components (B1) and (B2), preferably based on the total molar amount of component (B).

Preferably, component (B) comprises in the range from 47 to 53 mol % of component (B1) and in the range from 47 to 53 mol % of component (B2), based in each case on the sum total of the molar percentages of components (B1) and (B2), preferably based on the total molar amount of component (B).

More preferably, component (B) comprises in the range from 49 to 51 mol % of component (B1) and in the range from 49 to 51 mol % of component (B2), based in each case on the sum total of the molar percentages of components (B1) and (B2), preferably based on the total molar amount of component (B).

The present invention therefore also provides an agricultural film (AF) in which component (B) comprises in the range from 45 to 55 mol % of component (B1) and in the range from 45 to 55 mol % of component (B2), based in each case on the total molar amount of component (B).

The sum total of the molar percentages of components (B1) and (B2) present in component (B) typically adds up to 100 mol %.

Component (B) may also additionally comprise a component (B3), at least one $C_4$-$C_{20}$ diacid.

The present invention therefore also provides a polymer film (P) in which component (B) additionally comprises a component (B3), at least one $C_4$-$C_{20}$ diacid.

The terms "component (B3)" and "at least one $C_4$-$C_{20}$ diacid" are used synonymously in the context of the present invention and therefore have the same meaning.

When component (B) additionally comprises component (B3), it is preferable that component (B) comprises in the range from 25 to 54.9 mol % of component (B1), in the range from 45 to 55 mol % of component (B2) and in the range from 0.1 to 25 mol % of component (B3), based in each case on the total molar amount of component (B).

More preferably, component (B) in that case comprises in the range from 13 to 52.9 mol % of component (B1), in the range from 47 to 53 mol % of component (B2) and in the range from 0.1 to 13 mol % of component (B3), based in each case on the total molar amount of component (B).

Most preferably, component (B) in that case comprises in the range from 7 to 50.9 mol % of component (B1), in the range from 49 to 51 mol % of component (B2) and in the range from 0.1 to 7 mol % of component (B3), based in each case on the total molar amount of component (B).

When component (B) additionally comprises component (B3), the molar percentages of components (B1), (B2) and (B3) typically add up to 100 mole percent.

The monomer mixture (M) may additionally comprise water.

Components (B1) and (B2) and optionally (B3) of component (B) may react with one another to obtain amides. This reaction is known as such to those skilled in the art. Therefore, component (B) may comprise components (B1) and (B2) and optionally (B3) in fully reacted form, in partly reacted form or in unreacted form. Preferably, component (B) comprises components (B1) and (B2) and optionally (B3) in unreacted form.

In the context of the present invention, "in unreacted form" thus means that component (B1) is present in the form of the at least one $C_{32}$-$C_{40}$ dimer acid and component (B2) in the form of the at least one $C_4$-$C_{12}$ diamine and, if appropriate, component (B3) in the form of the at least one $C_4$-$C_{20}$ diacid.

If components (B1) and (B2) and, if appropriate, (B3) have at least partly reacted with one another, components (B1) and (B2) and, if appropriate, (B3) are at least partly in amide form.

Component (B1)

According to the invention, component (B1) is at least one $C_{32}$-$C_{40}$ dimer acid.

In the context of the present invention, "at least one $C_{32}$-$C_{40}$ dimer acid" means either exactly one $C_{32}$-$C_{40}$ dimer acid or a mixture of two or more $C_{32}$-$C_{40}$ dimer acids.

Dimer acids are also referred to as dimer fatty acids. $C_{32}$-$C_{40}$ dimer acids are known as such to those skilled in the art and are typically prepared by dimerization of unsaturated fatty acids. This dimerization can be catalyzed, for example, by aluminas.

Suitable unsaturated fatty acids for preparation of the at least one $C_{32}$-$C_{40}$ dimer acid are known those skilled in the art and are, for example, unsaturated $C_{16}$ fatty acids, unsaturated $C_{18}$ fatty acids and unsaturated $C_{20}$ fatty acids.

Preferably, component (B1) is therefore prepared proceeding from unsaturated fatty acids selected from the group consisting of unsaturated $C_{16}$ fatty acids, unsaturated $C_{18}$ fatty acids and unsaturated $C_{20}$ fatty acids, particular preference being given to the unsaturated $C_{18}$ fatty acids.

The present invention therefore also provides an agricultural film (AF) in which component (B1) is prepared proceeding from unsaturated fatty acids selected from the group consisting of unsaturated $C_{16}$ fatty acids, unsaturated $C_{18}$ fatty acids and unsaturated $C_{20}$ fatty acids.

An example of a suitable unsaturated $C_{16}$ fatty acid is palmitoleic acid ((9Z)-hexadeca-9-enoic acid).

Suitable unsaturated $C_{18}$ fatty acids are selected, for example, from the group consisting of petroselic acid ((6Z)-octadeca-6-enoic acid), oleic acid ((9Z)-octadeca-9-enoic acid), elaidic acid ((9E)-octadeca-9-enoic acid), vaccenic acid ((11E)-octadeca-11-enoic acid), linoleic acid ((9Z,12Z)-octadeca-9,12-dienoic acid), alpha-linolenic acid ((9Z,12Z,15Z)-octadeca-9,12,15-trienoic acid), gamma-linolenic acid ((6Z,9Z,12Z)-octadeca-6,9,12-trienoic acid), calendic acid ((8E,10E,12Z)-octadeca-8,10,12-trienoic acid), punicic acid ((9Z,11E,13Z)-octadeca-9,11,13-trienoic acid), alpha-eleostearic acid ((9Z,11E,13E)-octadeca-9,11,13-trienoic acid) and beta-eleostearic acid ((9E,11E,13E)-octadeca-9, 11,13-trienoic acid). Particular preference is given to unsaturated $C_{18}$ fatty acids selected from the group consisting of petroselic acid ((6Z)-octadeca-6-enoic acid), oleic acid ((9Z)-octadeca-9-enoic acid), elaidic acid ((9E)-octadeca-9-enoic acid), vaccenic acid ((11E)-octadeca-11-enoic acid), linoleic acid ((9Z,12Z)-octadeca-9,12-dienoic acid).

Suitable unsaturated $C_{20}$ fatty acids are selected, for example, from the group consisting of gadoleic acid ((9Z)-eicosa-9-enoic acid), eicosenoic acid ((11Z)-eicosa-11-enoic acid), arachidonic acid ((5Z,8Z,11Z,14Z)-eicosa-5,8,11,14-tetraenoic acid) and timnodonic acid ((5Z,8Z,11Z,14Z,17Z)-eicosa-5,8,11,14,17-pentaenoic acid).

Component (B1) is especially preferably at least one $C_{36}$ dimer acid.

The at least one $C_{36}$ dimer acid is preferably prepared proceeding from unsaturated $C_{18}$ fatty acids. More preferably, the $C_{36}$ dimer acid is prepared proceeding from $C_{18}$ fatty acids selected from the group consisting of petroselic acid ((6Z)-octadeca-6-enoic acid), oleic acid ((9Z)-octadeca-9-enoic acid), elaidic acid ((9E)-octadeca-9-enoic acid), vaccenic acid ((11E)-octadeca-11-enoic acid) and linoleic acid ((9Z,12Z)-octadeca-9,12-diensaure).

In the preparation of component (B1) from unsaturated fatty acids, trimer acids may additionally form; residues of unreacted unsaturated fatty acid may also remain.

The formation of trimer acids is known to those skilled in the art.

Preferably in accordance with the invention, component (B1) comprises not more than 0.5% by weight of unreacted unsaturated fatty acid and not more than 0.5% by weight of trimer acid, more preferably not more than 0.2% by weight of unreacted unsaturated fatty acid and not more than 0.2% by weight of trimer acid, based in each case on the total weight of component (B1).

Dimer acids (also known as dimerized fatty acids or dimer fatty acids) thus refer generally and especially in the context of the present invention to mixtures that are prepared by oligomerization of unsaturated fatty acids. They are preparable, for example, by catalytic dimerization of unsaturated fatty acids from vegetable sources, in which case the starting materials used are especially unsaturated $C_{16}$ to $C_{20}$ fatty acids. The addition is primarily of the Diels-Alder type, and the result, according to the number and position of the double bonds in the fatty acids used for preparation of the dimer acids, is mixtures of primarily dimeric products having cycloaliphatic, linear aliphatic, branched aliphatic and also $C_6$-aromatic hydrocarbyl groups between the carboxyl groups. According to the mechanism and/or any subsequent hydrogenation, the aliphatic radicals may be saturated or unsaturated, and the proportion of aromatic groups may also vary. The radicals between the carboxylic acid groups in that case comprise, for example, 32 to 40 carbon atoms. Preference is given to using fatty acids having 18 carbon atoms for the preparation, such that the dimeric product thus has 36 carbon atoms. Preferably, the radicals that connect the carboxyl groups of the dimer fatty acids do not have any unsaturated bonds or any aromatic hydrocarbyl radicals.

In the context of the present invention, $C_{18}$ fatty acids are thus preferably used in the preparation. Particular preference is given to using linolenic acid, linoleic acid and/or oleic acid.

Depending on the reaction regime, the oligomerization described above gives rise to mixtures comprising mainly dimeric molecules, but also trimeric molecules and also monomeric molecules and other by-products. Purification is typically by distillative means. Commercial dimer acids generally comprise at least 80% by weight of dimeric molecules, up to 19% by weight of trimeric molecules and not more than 1% by weight of monomeric molecules and other by-products.

It is preferable to use dimer acids consisting of dimeric fatty acid molecules to an extent of at least 90% by weight, preferably to an extent of at least 95% by weight, even more preferably to an extent of at least 98% by weight.

The proportions of monomeric, dimeric and trimeric molecules and other by-products in the dimer acids can be determined, for example, by means of gas chromatography (GC). The dimer acids here, prior to the GC analysis, are converted to the corresponding methyl esters via the boron trifluoride method (cf. DIN EN ISO 5509) and then analyzed by means of GC.

A fundamental characteristic of "dimer acids" in the context of the present invention is thus that the preparation thereof comprises the oligomerization of unsaturated fatty acids. This oligomerization gives rise primarily to dimeric products, i.e. preferably to an extent of at least 80% by weight, more preferably to an extent of at least 90% by weight, even more preferably to an extent of at least 95% by weight and especially to an extent of at least 98% by weight. The fact that the oligomerization thus gives rise predominantly to dimeric products comprising exactly two fatty acid molecules justifies this name, which is in common use in any case. An alternative expression for the term "dimer acids" in question is thus "mixture comprising dimerized fatty acids".

The dimer acids to be used are obtainable as commercial products. Examples of these include Radiacid 0970, Radiacid 0971, Radiacid 0972, Radiacid 0975, Radiacid 0976 and Radiacid 0977 from Oleon, Pripol 1006, Pripol 1009, Pripol 1012, and Pripol 1013 from Croda, Empol 1008, Empol 1012, Empol 1061 and Empol 1062 from BASF SE, and Unidyme 10 and Unidyme TI from Arizona Chemical.

Component (B1) has an acid number, for example, in the range from 185 to 200 mg KOH/g.

Component (B2)

According to the invention, component (B2) is at least one $C_4$-$C_{12}$ diamine.

In the context of the present invention, "at least one $C_4$-$C_{12}$ diamine" means either exactly one $C_4$-$C_{12}$ diamine or a mixture of two or more $C_4$-$C_{12}$ diamines.

In the context of the present compound, "$C_4$-$C_{12}$ diamine" is understood to mean aliphatic and/or aromatic compounds having four to twelve carbon atoms and two amino groups (—$NH_2$ groups). The aliphatic and/or aromatic compounds may be unsubstituted or additionally at least monosubstituted. If the aliphatic and/or aromatic compounds are additionally at least monosubstituted, they may bear one, two or more substituents that do not take part in the polymerization of components (A) and (B). Substituents of this kind are, for example, alkyl or cycloalkyl substituents. These are known as such to those skilled in the art. The at least one $C_4$-$C_{12}$ diamine is preferably unsubstituted.

Suitable components (B2) are selected, for example, from the group consisting of 1,4-diaminobutane (butane-1,4-diamine; tetramethylenediamine; putrescine), 1,5-diaminopentane (pentamethylenediamine; pentane-1,5-diamine; cadaverine), 1,6-diaminohexane (hexamethylenediamine; hexane-1,6-diamine), 1,7-diaminoheptane, 1,8-diaminooctane, 1,9-diaminononane, 1,10-diaminodecane (decamethylenediamine), 1,11-diaminoundecane (undecamethylenediamine) and 1,12-diaminododecane (dodecamethylenediamine).

Preferably, component (B2) is selected from the group consisting of tetramethylenediamine, pentamethylenediamine, hexamethylenediamine, decamethylenediamine and dodecamethylenediamine.

The present invention therefore also provides an agricultural film (AF) in which component (B2) is selected from the group consisting of tetramethylenediamine, pentamethylenediamine, hexamethylenediamine, decamethylenediamine and dodecamethylenediamine.

Component (B3)

According to the invention, any component (B3) present in component (B) is at least one $C_4$-$C_{20}$ diacid.

In the context of the present invention, "at least one $C_4$-$C_{20}$ diacid" means either exactly one $C_4$-$C_{20}$ diacid or a mixture of two or more $C_4$-$C_{20}$ diacids.

In the context of the present invention, "$C_4$-$C_{20}$ diacid" is understood to mean aliphatic and/or aromatic compounds having 2 to 18 carbon atoms and two carboxyl groups (—COOH groups). The aliphatic and/or aromatic compounds may be unsubstituted or additionally at least monosubstituted. If the aliphatic and/or aromatic compounds are additionally at least monosubstituted, they may bear one, two or more substituents that do not take part in the polymerization of components (A) and (B). Substituents of this kind are, for example, alkyl or cycloalkyl substituents. These are known to those skilled in the art. Preferably, the at least one $C_4$-$C_{20}$ diacid is unsubstituted.

Suitable components (B3) are selected, for example, from the group consisting of butanedioic acid (succinic acid), pentanedioic acid (glutaric acid), hexanedioic acid (adipic acid), heptanedioic acid (pimelic acid), octanedioic acid (suberic acid), nonanedioic acid (azelaic acid), decanedioic acid (sebacic acid), undecanedioic acid, dodecanedioic acid, tridecanedioic acid, tetradecanedioic acid and hexadecanedioic acid.

Preferably, component (B3) is selected from the group consisting of pentanedioic acid (glutaric acid), hexanedioic acid (adipic acid), decanedioic acid (sebacic acid), dodecanedioic acid.

Production of the Agricultural Film (AF)

The agricultural film (AF) is preferably produced in a process comprising the following steps:

i) providing at least one copolyamide prepared by polymerization of the following components:
   (A) 5% to 99% by weight of at least one lactam,
   (B) 1% to 95% by weight of a monomer mixture (M) comprising the following components:
      (B1) at least one $C_{32}$-$C_{40}$ dimer acid and
      (B2) at least one $C_4$-$C_{12}$ diamine,
   where the sum total of the percentages by weight of components (A) and (B) is based in each case on the sum total of the percentages by weight of components (A) and (B) in molten form in a first extruder, ii) extruding the at least one copolyamide in molten form provided in step i) out of the first extruder through a die to obtain a film of the at least one copolyamide in molten form, iii) cooling the film obtained in step ii) of the at least one copolyamide in molten form, with solidification of the at least one copolyamide to obtain the agricultural film (AF).

The present invention therefore also provides a process for producing an agricultural film (AF) of the invention, comprising the steps of i) providing at least one copolyamide prepared by polymerization of the following components:
   (A) 5% to 99% by weight of at least one lactam,
   (B) 1% to 95% by weight of a monomer mixture (M) comprising the following components:
      (B1) at least one $C_{32}$-$C_{40}$ dimer acid and
      (B2) at least one $C_4$-$C_{12}$ diamine,
   where the percentages by weight of components (A) and (B) are based in each case on the sum total of the percentages by weight of components (A) and (B) in molten form in a first extruder, ii) extruding the at least one copolyamide in molten form provided in step i) out of the first extruder through a die to obtain a film of the at least one copolyamide in molten form, iii) cooling the film of the at least one copolyamide in molten form obtained in step ii), with solidification of the at least one copolyamide to obtain the agricultural film (AF).

In step i), the at least one copolyamide in molten form is provided in a first extruder.

In the context of the present invention, "a first extruder" means either exactly one first extruder or two or more first extruders. Typically, as many first extruders are used as first layers comprising the at least one copolyamide are to be present in the agricultural film (AF).

If the agricultural film (AF) is to comprise, for example, exactly one first layer comprising the at least one copolyamide, exactly one first extruder is used. If the agricultural film (AF) is to comprise exactly two first layers comprising the at least one copolyamide, exactly two first extruders are used. If the agricultural film (AF) is to comprise exactly five first layers comprising the at least one copolyamide, exactly five first extruders are used.

For example, 1 to 11 first extruders are used, preferably 1 to 5 first extruders and more preferably 1 to 3 first extruders.

In respect of the at least one copolyamide which is provided in step i), the above-described embodiments and preferences for the at least one copolyamide present in the agricultural film (AF) are correspondingly applicable.

According to the invention, the at least one copolyamide is provided in molten form.

In the context of the present invention, "in molten form" means that the at least one copolyamide is provided at a temperature above the melting temperature ($T_{M(C)}$) of the at least one copolyamide. "In molten form" thus means that the at least one copolyamide is at a temperature above the melting temperature ($T_{M(C)}$) of the at least one copolyamide. If the at least one copolyamide is in molten form, the at least one copolyamide is free-flowing.

"Free-flowing" means that the at least one copolyamide can be conveyed within the first extruder and that the at least one copolyamide can be extruded out of the first extruder.

For example, the at least one copolyamide is provided in step i) at a temperature in the range from 170 to 300° C., preferably in the range from 200 to 290° C. and especially preferably in the range from 230 to 280° C., in each case with the proviso that the temperature at which the at least one copolyamide is provided is above the melting temperature ($T_{M(C)}$) of the at least one copolyamide.

The at least one copolyamide can be provided in molten form in the first extruder by any methods known to those skilled in the art.

For example, the at least one copolyamide can be supplied to the first extruder in molten form or in solid form. If the at least one copolyamide is supplied to the first extruder in solid form, it can be supplied to the first extruder, for example, in the form of pellets and/or in the form of powder. The at least one copolyamide is then melted in the first extruder and thus provided in molten form in the first extruder. This embodiment is preferred.

In addition, it is possible that components (A) and (B) are polymerized directly in the first extruder and the at least one copolyamide is thus provided in molten form in the first extruder. Processes for this purpose are known to those skilled in the art.

In step ii), the at least one copolyamide in molten form is extruded out of the first extruder through a die to obtain a film of the at least one copolyamide in molten form.

In the context of the present invention, "a die" means either exactly one die or two or more dies. Preference is given in accordance with the invention to exactly one die.

Suitable dies are all dies known to those skilled in the art that enable extrusion of a film composed of the at least one copolyamide in molten form. Examples of dies of this kind are annular dies or slot dies.

Suitable annular dies and slot dies are known as such to those skilled in the art.

If, for example, the step i1) described further down is conducted, it is preferable that, in step ii), the at least one copolyamide in molten form from the first extruder is combined with the at least one further polymer (FP) in molten form from the further extruder in the die, for example in the annular die or in the slot die.

More particularly, in step ii), the at least one copolyamide in molten form from the first extruder is combined with the at least one further polymer (FP) in molten form from the further extruder in the die in such a way that the film obtained in step ii) of the at least one copolyamide and the at least one further polymer (FP), each in molten form, comprises at least one first layer comprising the at least one copolyamide in molten form, and at least one further layer comprising the at least one further polymer (FP) in molten form.

For example, the thickness of the film of the at least one copolyamide in molten form is in the range from 0.1 µm to 1 mm, preferably in the range from 5 to 500 µm and especially preferably in the range from 20 to 100 µm.

The film of the at least one copolyamide in molten form may, for example, be a flat film or a tubular film. A tubular film is typically obtained when the die used is an annular die; a flat film is obtained when the die used is a slot die.

In step iii), the film obtained in step ii) of the at least one copolyamide in molten form is cooled down. This results in solidification of the at least one copolyamide to obtain the agricultural film (AF).

Suitable methods of cooling of the film of the at least one copolyamide in molten form are all those known to the person skilled in the art. For example, the film of the at least one copolyamide in molten form can be cooled by air or water cooling or by contact with a cold surface.

The film of the at least one copolyamide in molten form is cooled down in step iii), for example, to a temperature below the melting temperature ($T_{M(C)}$) of the at least one copolyamide to obtain the agricultural film (AF). Preferably, the film of the at least one copolyamide in molten form in step iii) is cooled down to a temperature below the glass transition temperature ($T_{G(c)}$) of the at least one copolyamide.

For example, the film of the at least one copolyamide in molten form is cooled down to a temperature in the range from 0 to 100° C., preferably in the range from 10 to 80° C. and especially preferably in the range from 15 to 50° C., the temperature to which the film of the at least one copolyamide in molten form is cooled down being below the melting temperature ($T_{M(C)}$), preferably below the glass transition temperature ($T_{G(C)}$), of the at least one copolyamide.

The present invention therefore also provides a process for producing an agricultural film (AF) in which, in step iii), the film of the at least one copolyamide in molten form is cooled down to a temperature below the melting temperature ($T_{M(C)}$) of the at least one copolyamide.

In respect of the agricultural film (AF) obtained in step iii), the embodiments and preferences described in respect of the agricultural film (AF) of the invention are correspondingly applicable. Steps ii) and iii) can be conducted successively or simultaneously.

Preference is given to additionally conducting a step i1) in which at least one further polymer (FP) in molten form is provided in a further extruder.

In that case, the process for producing the agricultural film (AF) comprises the following steps:

i) providing at least one copolyamide prepared by polymerizing the following components:
 (A) 5% to 99% by weight of at least one lactam,
 (B) 1% to 95% by weight of a monomer mixture (M) comprising the following components:
  (B1) at least one $C_{32}$-$C_{40}$ dimer acid and
  (B2) at least one $C_4$-$C_{12}$ diamine,
  where the percentages by weight of components (A) and (B) are each based on the sum total of the percentages by weight of components (A) and (B), in molten form in a first extruder,
i1) providing at least one further polymer (FP) in molten form in a further extruder,
ii) extruding the at least one copolyamide in molten form provided in step i) out of the first extruder through a die and extruding the at least one further polymer (FP) in molten form provided in step i1) from the further extruder through the die to obtain a film of the at least one copolyamide and the at least one further polymer (FP), each in molten form,
iii) cooling the film obtained in step ii) of the at least one copolyamide and the at least one further polymer (FP), each in molten form, with solidification of the at least one copolyamide and/or the at least one further polymer (FP) to obtain the agricultural film (AF).

In step i1), the at least one further polymer (FP) in molten form is provided in a further extruder.

In the context of the present invention, "a further extruder" means either exactly one further extruder or two or more further extruders. Preference is given to two or more further extruders.

Preference is given to using as many further extruders as further layers comprising the at least one further polymer (FP) are to be present in the agricultural film (AF). For example, 1 to 13 further extruders are used, preferably 1 to 11 further extruders and especially preferably 1 to 7 further extruders.

If the agricultural film (AF), for example, is to comprise exactly one further layer comprising the at least one further polymer (FP), exactly one further extruder is used. If the agricultural film (AF) is to comprise exactly two further layers comprising the at least one further polymer (FP), exactly two further extruders are used. If the agricultural film (AF) is to comprise exactly five further layers comprising the at least one further polymer (FP), exactly five further extruders are used.

In respect of the further extruder, the embodiments and preferences described above for the first extruder are correspondingly applicable.

In respect of the at least one further polymer (FP), the embodiments and preferences described above for the at least one further polymer (FP) that may be present in the agricultural film (AF) are correspondingly applicable.

According to the invention, the at least one further polymer (FP) in step i1) is provided in molten form. "In molten form" means the at least one further polymer (FP) is provided at a temperature above the melting temperature ($T_{M(FP)}$) of the at least one further polymer (FP). "In molten form" thus means that the at least one further polymer (FP) is at a temperature above the melting temperature ($T_{M(FP)}$) of the at least one further polymer (FP). If the at least one further polymer (FP) is in molten form, the at least one further polymer (FP) is free-flowing.

"Free-flowing" means that the at least one further polymer (FP) can be conveyed within the further extruder and that the at least one further polymer (FP) can be extruded out of the further extruder.

For example, the at least one further polymer (FP) in step i1) is provided at a temperature in the range from 120 to 350° C., preferably in the range from 130 to 300° C. and especially preferably in the range from 140 to 250° C., in each case with the proviso that the temperature at which the at least one further polymer (FP) is provided is above the melting temperature ($T_{M(FP)}$) of the at least one further polymer (FP).

The at least one further polymer (FP) may be provided in molten form in the further extruder by any methods known to those skilled in the art.

For example, the at least one further polymer (FP) can be supplied to the further extruder in molten form or in solid form. If the at least one further polymer (FP) is supplied to the further extruder in solid form, it can be supplied to the further extruder, for example, in the form of pellets and/or in the form of powder. In that case, the at least one further polymer (FP) is melted in the further extruder and thus provided in molten form in the further extruder.

Step i1) is typically conducted simultaneously with step i).

In respect of steps i), ii) and iii) in the process in which step i1) is conducted, the embodiments and preferences described above for steps i), ii) and iii) in the process without step i1) are correspondingly applicable.

The film obtained in step ii) of the at least one copolyamide and of the at least one further polymer (FP), each in molten form, comprises the at least one copolyamide in at least one first layer and the at least one further polymer (FP) in at least one further layer. Typically, the film obtained in step ii) has as many first layers comprising the at least one copolyamide in molten form as first extruders were used in step i) and as many further layers comprising the at least one further polymer (FP) in molten form as further extruders were used in step i1).

It will be apparent that, when step i1) is conducted, the agricultural film (AF) obtained in step iii) is a multilayer film.

Preferably, the agricultural film (AF) is stretched. The agricultural film (AF) can be stretched after step iii); it is likewise possible to stretch the agricultural film (AF) during step iii), i.e. during the cooling of the film of the at least one copolyamide and optionally of the at least one further polymer (FP).

The present invention therefore also provides a process in which the following step is additionally conducted:

iv) stretching the agricultural film (AF) to obtain a stretched agricultural film (AF).

Steps iii) and iv) can be conducted successively or simultaneously.

In the stretching of the agricultural film (AF), the polymer chains of the at least one copolyamide become aligned and the crystallinity of the at least one copolyamide can increase.

It is additionally possible that the polymer chains of any at least one further polymer (FP) present in the agricultural film (AF) are aligned in the course of stretching. This can also increase the crystallinity of the at least one further polymer (FP).

The stretching can be effected by any methods known to those skilled in the art.

For example, the agricultural film (AF) can be stretched by guiding it over at least one roll, preferably a roll system, or by extending it widthwise. If the agricultural film (AF) is obtained in the form of a tube, it is likewise possible that the agricultural film (AF) is stretched by blowing, air into the tube of the agricultural film (AF) and hence stretching the agricultural film (AF). It will be appreciated that combinations of the methods are also possible.

When the agricultural film (AF) is guided over at least one roll, preferably through a roll system, the agricultural film (AF) is stretched in extrusion direction, i.e. lengthwise. If the agricultural film (AF), by contrast, is extended widthwise, it is stretched at right angles to extrusion direction.

If the agricultural film (AF), for stretching, is guided over at least one roll, preferably through a roll system, the polymer chains of the at least one copolyamide and of any at least one further polymer (FP) are aligned parallel to the direction in which stretching is effected. The stretched agricultural film (AF) obtained is then uniaxially oriented. The stretched agricultural film obtained (AF) is likewise uniaxially oriented when the agricultural film (AF), for stretching, is extended widthwise. In that case too, the polymer chains of the at least one copolyamide and of any at least one further polymer (FP) are aligned parallel to the direction in which stretching is effected.

"Uniaxially oriented" means that the polymer chains are aligned essentially in one direction.

If the agricultural film (AF), for stretching, is guided over a roll system and additionally extended widthwise, the polymer chains of the at least one copolyamide and of any at least one further polymer (FP) are aligned parallel to both directions in which stretching is effected. The stretched agricultural film (AF) obtained is then biaxially oriented.

"Biaxially oriented" means that the polymer chains are aligned essentially in two different directions, preferably at right angles to one another.

If the agricultural film (AF) is obtained in tubular form and the agricultural film (AF) is stretched by blowing air into the tube of the agricultural film (AF), the stretched agricultural film (AF) obtained is uniaxially oriented.

If the above-described processes for stretching the agricultural film (AF) are combined, the agricultural film (AF) is thus obtained, for example, in tubular form and the agricultural film (AF) is stretched by blowing air into the tube of the agricultural film (AF) and simultaneously guided over rolls and likewise stretched; thus, the stretched agricultural film (AF) obtained is biaxially oriented.

The agricultural film (AF) is typically stretched at a temperature above the glass transition temperature ($T_{G(C)}$) of the at least one copolyamide and below the melting temperature ($T_{M(C)}$) of the at least one copolyamide. It the agricultural film (AF) is a multilayer film, it is also preferable that the agricultural film (AF) is stretched at a temperature below the melting temperature ($T_{M(FP)}$) of the at least one further polymer (FP), especially preferably at a temperature below the melting temperature of the at least one further polymer (FP) having the lowest melting temperature.

The agricultural film (AF) of the invention can be produced, for example, in a casting process or in a blowing process.

The present invention therefore also provides an agricultural film (AF), wherein the agricultural film (AF) is produced in a casting process or in a blowing process.

The casting process and the blowing process are known as such to those skilled in the art. Typically, the agricultural film (AF) is stretched in these processes, such that a stretched agricultural film (AF) is obtained.

A casting process for producing the agricultural film (AF) preferably comprises the following steps i-c) to iv-c):

i-c) providing at least one copolyamide prepared by polymerizing the following components:
  (A) 5% to 99% by weight of at least one lactam,
  (B) 1% to 95% by weight of a monomer mixture (M) comprising the following components:
    (B1) at least one $C_{32}$-$C_{40}$ dimer acid and
    (B2) at least one $C_4$-$C_{12}$ diamine,
    where the percentages by weight of components (A) and (B) are each based on the sum total of the percentages by weight of components (A) and (B), in molten form in a first extruder,
ii-c) extruding the at least one copolyamide in molten form provided in step i-c) out of the first extruder through a die to obtain a film of the at least one copolyamide in molten form,
iii-c) cooling the film of the at least one copolyamide in molten form obtained in step ii-c), with solidification of the at least one copolyamide to obtain the agricultural film (AF),
iv-c) stretching the agricultural film (AF) obtained in step iii-c) by guiding the agricultural film (AF) over at least one roll, preferably over a roll system, to obtain a stretched agricultural film (AF).

In respect of steps i-c) to iii-c) of the casting process, the embodiments and preferences described above for steps i) to iii) of the process for producing the agricultural film (AF) are correspondingly applicable.

The die used in the casting process in step ii-c) is typically a slot die. The film of the at least one copolyamide in molten form obtained in step ii-c) is therefore preferably a flat film, and so the agricultural film (AF) obtained in step iii-c) and the stretched agricultural film (AF) obtained in step iv-c) are preferably flat films.

In the casting process, steps iii-c) and iv-c) can be conducted successively or simultaneously. Preferably, in the casting process, steps iii-c) and iv-c) are conducted simultaneously; especially preferably, steps iii-c) and iv-c) are conducted simultaneously and directly after step ii-c).

It is also preferable that, in the casting process, the at least one roll used in step iv-c), preferably the roll system, is cooled during step iv-c).

A blowing process for producing the agricultural film (AF) preferably comprises the following steps i-b) to iv-b):

i-b) providing at least one copolyamide prepared by polymerizing the following components:
  (A) 5% to 99% by weight of at least one lactam,
  (B) 1% to 95% by weight of a monomer mixture (M) comprising the following components:
    (B1) at least one $C_{32}$-$C_{40}$ dimer acid and
    (B2) at least one $C_4$-$C_{12}$ diamine,
    where the percentages by weight of components (A) and (B) are each based on the sum total of the percentages by weight of components (A) and (B), in molten form in a first extruder,
ii-b) extruding the at least one copolyamide in molten form provided in step i-b) out of the first extruder through a die, which is an annular die, to obtain a tubular film of the at least one copolyamide in molten form,
iii-b) cooling the tubular film of the at least one copolyamide in molten form obtained in step ii-b), with solidification of the at least one copolyamide to obtain the agricultural film (AF),
iv-b) stretching the agricultural film (AF) obtained in step iii-b) by blowing air into the tube of the agricultural film (AF) and/or conducting the tube through a roll system to obtain a stretched agricultural film (AF).

In respect of steps i-b) to iii-b) of the blowing process, the embodiments and preferences described above for steps i) to iii) of the process for producing the agricultural film (AF) are correspondingly applicable.

The die used in step ii-b) of the blowing process is preferably a stack die, a helical distributor die or a mixed form thereof. These dies are known to those skilled in the art and are described, for example, in "Blown Film Extrusion" by Kirk Cantor, 2nd Edition, Carl Hanser Verlag, Munich 2011.

Steps iii-b) and iv-b) in the blowing process can be conducted simultaneously or successively. Preferably, in the blowing process, steps iii-b) and iv-b) are conducted simultaneously.

It will be apparent that, when steps iii-b) and iv-b) in the blowing process are conducted simultaneously, the tubular film of the at least one copolyamide obtained in molten form in step ii-b) is cooled down in step iii-b) and simultaneously stretched by blowing air into the tubular film to obtain the stretched agricultural film (AF).

It will be apparent that, in the casting process and in the blowing process, it is likewise optionally possible to conduct step i1) in which at least one further polymer (FP) is provided in molten form in a further extruder and that in that case, correspondingly, in step ii) of the process for producing the agricultural film (AF), in step ii-c) and in step ii-b), a film of the at least one copolyamide and of the at least one further polymer (FP), each in molten form, is obtained and this is cooled down in accordance with step iii) of the process for producing the agricultural film (AF) in step iii-c) and in step iii-b).

In respect of the optionally conducted step i1), the embodiments and preferences described above for the optionally conducted step i1) of the process for producing the agricultural film (AF) are correspondingly applicable.

The stretched agricultural film (AF) obtained can, for example, be wound up subsequently to its production. Methods for this purpose are known to those skilled in the art. If the stretched agricultural film (AF) is obtained in tubular form, as, for example, in the blowing process, the tube can also be slit before being wound up. A slit film can then be wound up on one or more rolls.

The present invention is elucidated in detail hereinafter with reference to examples.

EXAMPLES

The properties of the agricultural films (AF) were determined as follows:

The viscosity number of copolyamides comprising units derived from a $C_{32}$-$C_{40}$ dimer acid was determined in a 0.5% by weight solution of phenol/o-dichlorobenzene in a weight ratio of 1:1 at 25° C.

The viscosity number of copolyamides and polyimides that do not comprise any units derived from a $C_{32}$-$C_{40}$ dimer acid was determined in a 0.5% by weight solution in 96% by weight sulfuric acid at 25° C. according to EN ISO 307: 2007+Amd 1: 2013.

The glass transition temperatures and melting temperatures were determined according to ISO 11357-1: 2009, ISO 11357-2: 2013 and ISO 11357-3: 2011. For this purpose, two heating runs were conducted and the glass transition and melting temperatures were ascertained from the second heating run.

The densities of the polyamides were determined by the gas pycnometer method according to EN ISO 1183-3: 1999.

For determination of the proportion of polyamide-6,36 in the copolyamide, the copolyamide was hydrolyzed in dilute hydrochloric acid (20%). This protonates the units derived from hexamethylenediamine, with the chloride ion from the hydrochloric acid forming the counterion.

By means of ion exchanger, this chloride ion was then exchanged for a hydroxide ion with release of hexamethylenediamine. By titration with 0.1 molar hydrochloric acid, the hexamethylenediamine concentration is then determined, from which the proportion of polyamide-6,36 in the copolyamide can be determined.

Tear propagation resistance is determined according to Elmendorf, DIN ISO 6383-2: 2004 in extrusion direction (MD) and at right angles thereto (TD). The films were conditioned under standard climatic conditions for non-tropical countries according to DIN EN ISO 291: 2008.

Modulus of elasticity is determined according to ISO 527-3: 1995.

The impact resistance of the monofilms was determined according to DIN ISO 7765-2: 1994 with 5 specimens at a relative air humidity of 50% (50% AH), with reporting of the puncture energy in the present context.

The impact resistance of the multilayer films was determined according to DIN ISO 7765-2: 1994 with 5 specimens at a relative air humidity of 0% (0% AH), with reporting of the puncture energy in the present context.

The acid stability of monofilms was determined in sulfuric acid. For this purpose, monofilms were mounted in polypropylene slide frames and immersed in sulfuric acid, and a check was made after 24 h as to whether the monofilm is still intact. Depending on the production process for the monofilms, a different concentration of sulfuric acid was used. Monofilms produced by a casting process were placed into 30% sulfuric acid; monofilms produced by a blowing process were placed into 25% sulfuric acid. In the tables which follow, in connection with acid stability, "0" means that the monofilm is still intact after immersion in sulfuric acid for 24 h; "X" means that the monofilm has dissolved.

The following polymers were used:

Polyamides

P-1 nylon-6 from BASF SE®, sold under the Ultramid B40L brand name, with a viscosity number of 250 mL/g, a glass transition temperature of 57° C., a melting temperature of 220° C. and a density of 1.153 g/mL.

P-2 nylon-6 from BASF SE®, sold under the Ultramid B33L brand name, with a viscosity number of 195 mL/g, a glass transition temperature of 56° C., a melting temperature of 220° C. and a density of 1.145 g/mL.

P-3 copolymer of nylon-6 and nylon-6,6 (PA 6/6.6) from BASF SE®, sold under the Ultramid C40L brand name, with a viscosity number of 250 mL/g, a glass transition temperature of 53° C., a melting temperature of 190° C. and a density of 1.143 g/mL.

P-4 copolymer of nylon-6 and nylon-6,6 (PA 6/6.6) from BASF SE®, sold under the Ultramid C33L brand name, with a viscosity number of 195 mL/g, a glass transition temperature of 55° C., a melting temperature of 196° C. and a density of 1.144 g/mL.

Copolyamides with Dimer Acid:

C-1 A copolyamide of nylon-6 and polyamide-6,36, prepared by the following method:

900 kg of caprolactam (component (A)), 83.5 kg of Pripol 1009 from Croda ($C_{36}$ dimer acid, hydrogenated, component (B1)), 19.9 kg of 85% by weight hexamethylenediamine solution (component (B2)) in water, 100 g of Polyapp 2557-CTW antifoam reagent composed of polymethylsiloxane from Polystell do Brazil and 100 kg of water were mixed in a 1930 L tank and blanketed with nitrogen. The outside temperature of the tank was heated to 290° C. and the mixture present in the tank was stirred at this temperature for 11 hours. In the first 7 h the mixture was stirred at elevated pressure, in the next 4 hours under reduced pressure, during which the water formed was distilled off. The copolyamide thus obtained was then discharged from the tank, extruded and pelletized. After the pellets of the copolyamide obtained had been extracted with water at 95° C. for 4×6 hours, the copolyamide was dried at 90 to 140° C. in a nitrogen stream for 10 hours. The viscosity number was 246 mL/g, the glass transition temperature was 49° C. and the melting temperature was 211° C. The proportion of polyamide-6,36 in the copolyamide, based on the total weight of the copolyamide, was 10.5% by weight; the density was 1.116 g/mL.

C-2 A copolyamide of nylon-6 and polyamide-6,36, prepared by the following method:

1039 kg of caprolactam (component (A)), 216 kg of Pripol 1009 from Croda ($C_{36}$ dimer acid, hydrogenated, component (B1)), 51.7 kg of 85% by weight hexamethylenediamine solution (component (B2)) in water, 100 g of Polyapp 2557-CTW antifoam reagent from Polystell do Brazil and 142 kg of water were mixed in a 1930 L tank and blanketed with nitrogen. The outside temperature of the tank was heated to 290° C. and the mixture was stirred at this temperature for 11 hours. In the first 7 h the mixture was stirred at elevated pressure, in the next 4 hours under reduced pressure, during which the water formed was distilled off. The copolyamide obtained was discharged from the tank, extruded and pelletized. The pellets of the copolyamide obtained were extracted with water at 95° C. for 4×6 hours and then dried at 90 to 140° C. in a nitrogen stream for 10 hours. The copolyamide obtained had a viscosity number of 244 mL/g, a glass transition temperature of 44° C. and a melting temperature of 203° C. The proportion of polyamide-6,36 in the copolyamide, based on the total weight of the copolyamide, was 20.8% by weight; the density was 1.095 g/mL.

C-3 A copolyamide of nylon-6 and polyamide-6,36, prepared by the following method:

932 kg of caprolactam (component (A)), 323.2 kg of Pripol 1009 from Croda ($C_{36}$ dimer acid, hydrogenated, component (B1)), 77.84 kg of 85% by weight hexamethylenediamine solution (component (B2)) in water and 153 kg of water were mixed in a 1930 L tank and blanketed with nitrogen. The outside temperature of the tank was heated to 290° C. and the mixture was stirred at this temperature for 11 hours. In the first 7 h the mixture was stirred at elevated pressure, in the next 4 hours under reduced pressure, during which water formed was distilled off. The copolyamide obtained was discharged from the tank, extruded and pelletized. The pellets of the copolyamide obtained were extracted with water at 95° C. for 4×6 hours and then dried at 90 to 140° C. in a nitrogen stream for 10 hours. The copolyamide obtained had a viscosity number of 259 mL/g, a glass transition temperature of 38° C. and a melting temperature of 188° C. The proportion of polyamide-6,36 in the copolyamide, based on the total weight of the copolyamide, was 30.3% by weight; the density was 1.076 g/mL.

C-4 A copolyamide of nylon-6 and polyamide-6,36, prepared by the following method:

932 kg of caprolactam (component (A)), 322 kg of Empol 1061 from BASF SE ($C_{36}$ dimer acid, unhydrogenated, component (B1)), 77.84 kg of 85% by weight hexamethylenediamine solution (component (B2)) in water and 153 kg of water were mixed in a 1930 L tank and blanketed with nitrogen. The outside temperature of the tank was heated to 290° C. and the mixture was stirred at this temperature for 11 hours. In the first 7 h the mixture was stirred at elevated pressure, in the next 4 hours under reduced pressure, during which water formed was distilled off. The copolyamide obtained was discharged from the tank, extruded and pelletized. The pellets of the copolyamide obtained were extracted with water at 95° C. for 4×6 hours and then dried at 90 to 140° C. in a nitrogen stream for 10 hours. The copolyamide obtained had a viscosity number of 212 mL/g, a glass transition temperature of 38° C. and a melting temperature of 187° C. The proportion of polyamide-6,36 in the copolyamide, based on the total weight of the copolyamide, was 28.9% by weight; the density was 1.076 g/mL.

Further Polymer (FP)

FP-1 Low-density polyethylene (LDPE) from LyondellBasell®, sold under the Lupolen 2420 F brand name with an MFR (melt flow rate) (190° C./2.16 kg) of 0.75 g/10 min.

FP-2 Low-density polyethylene (LDPE) from LyondellBasell®, sold under the Lupolen 3020 K brand name with an MFR (melt flow rate) (190° C./2.16 kg) of 4 g/10 min.

FP-3 Anhydride-modified linear low-density polyethylene (LLDPE) from DuPont®, sold under the Bynel 4104 brand name with an MFR (melt flow rate) (190° C./2.16 kg) of 1.1 g/10 min.

FP-4 Anhydride-modified linear low-density polyethylene (LLDPE) from DuPont®, sold under the Bynel 4105 brand name with an MFR (melt flow rate) (190° C./2.16 kg) of 4 g/10 min.

FP-5 A poly(ethyl-vinyl alcohol) (EVOH) from Kuraray®, sold under the EVAL F171B brand name with an MFR (melt flow rate) (210° C./2.16 kg) of 1.8 g/10 min and an ethylene content of 32 mol %.

FP-6 A poly(ethyl-vinyl alcohol) (EVOH) from Kuraray®, sold under the EVAL L171B brand name with an MFR (melt flow rate) (210° C./2.16 kg) of 4 g/10 min and an ethylene content of 27 mol %.

Production of Monofilms by a Casting Process

For production of monofilms, a 7-layer cast film system from Collin® with a die head width of 800 mm was used. Thus, 7 extruders were used. 6 of the extruders had a diameter of 30 mm (extruders B, C, D, E, F, G); one extruder had a diameter of 45 mm (extruder A). Each of the 7 extruders were loaded with the same component. The melt from extruder A was in contact with the casting roll; the melt from extruder G was the furthest removed therefrom. The sequence of the layers was A, B, C, D, E, F, G. The films produced had a thickness of 100 μm and the layers had a layer thickness of 15/14/14/14/14/14/15 μm. The components used and the results of the measurement of the tear propagation resistance, modulus of elasticity and puncture resistance are specified in table 1. The percentages by weight of component (B) specified in table 1 are understood to mean the percentages by weight of units derived from component (B) (polyamide-6,36 units) in the copolyamide, based on the total weight of the copolyamide.

TABLE 1

| Component | | V1<br>P-2 | V2<br>P-4 | V3<br>FP-1 | B4<br>C-1 | B5<br>C-2 | B6<br>C-3 |
|---|---|---|---|---|---|---|---|
| Component (B) | [% by wt.] | — | — | — | 10.5 | 20.8 | 30.3 |
| Tear propagation resistance (MD) | [mN] | 2337<br>(8N pendulum) | 2601<br>(8N pendulum) | 3704<br>(8N pendulum) | 3076<br>(8N pendulum) | 6329<br>(32N pendulum) | 7706<br>(32N pendulum) |
| Tear propagation resistance (TD) | [mN] | 2046<br>(8N pendulum) | 3337<br>(8N pendulum) | 6424<br>(8N pendulum) | 2734<br>(8N pendulum) | 6087<br>(8N pendulum) | 7588<br>(8N pendulum) |
| Puncture energy (50% AH) | [J] | 5.5 | 3.9 | 0.5 | 5.6 | 5.6 | 6.5 |
| Modulus of elasticity (MD) | [MPa] | 758 | 439 | 166 | 713 | 621 | 514 |
| Modulus of elasticity (TD) | [MPa] | 756 | 469 | 167 | 684 | 621 | 365 |
| Stability in 30% sulfuric acid | | 0 | X | | 0 | 0 | 0 |

Production of Multilayer Films by a Casting Process

Multilayer films comprising three different polymers were produced in the above-described 7-layer cast film system from Collin®. The multilayer films obtained had a thickness of 100 μm and the layers had a layer thickness of 15/14/14/14/14/14/15 μm. The extruders of the cast film system were charged with the components in accordance with the makeup of the multilayer films specified in table 2. The percentages by weight of component (B) specified in table 2 are understood to mean the percentages by weight of units derived from component (B) (polyamide-6,36 units) in the copolyamide, based on the total weight of the copolyamide. Table 2 also states the properties of the multilayer film produced.

TABLE 2

| | V7 | V8 | B9 | B10 | B11 |
|---|---|---|---|---|---|
| Makeup | FP-2 // FP-4 //<br>P-2 // P-2 // P-2 //<br>FP-4 // FP-2 | FP-2 // FP-4 //<br>P-4 // P-4 II P-4 //<br>FP-4 // FP-2 | FP-2 // FP-4 //<br>C-1 // C-1 // C-1 //<br>FP-4 // FP-2 | FP-2 // FP-4 //<br>C-2 // C-2 // C-2 //<br>FP-4 // FP-2 | FP-2 // FP-4 //<br>C-3 // C-3 // C-3 //<br>FP-4 // FP-2 |

TABLE 2-continued

|  |  | V7 | V8 | B9 | B10 | B11 |
|---|---|---|---|---|---|---|
| Component (B) | [% by wt.] | — | — | 10.5 | 20.8 | 30.3 |
| Tear propagation resistance (MD) | [mN] | 1293 (8N pendulum) | 1850 (8N pendulum) | 1702 (8N pendulum) | 2841 (8N pendulum) | 5874 (8N pendulum) |
| Tear propagation resistance (TD) | [mN] | 1438 (8N pendulum) | 1998 (8N pendulum) | 2131 (8N pendulum) | 3709 (8N pendulum) | 15856 (32N pendulum) |
| Puncture energy (0% AH) | [J] | 0.3 | 0.3 | 0.3 | 1.4 | 3.1 |
| Modulus of elasticity (MD) | [MPa] | 437 | 347 | 431 | 408 | 353 |
| Modulus of elasticity (TD) | [MPa] | 432 | 344 | 442 | 403 | 328 |

Production of Multilayer Films by a Casting Process

Multilayer films comprising five different polymers were produced in the above-described 7-layer cast film system from Collin®. The multilayer films obtained had a thickness of 100 μm and the layers had a layer thickness of 15/14/14/14/14/14/15 μm. The extruders of the cast film system were charged with the components in accordance with the makeup of the multilayer films specified in table 3. The percentages by weight of component (B) specified in table 3 are understood to mean the percentages by weight of units derived from component (B) (polyamide-6,36 units) in the copolyamide, based on the total weight of the copolyamide. Table 3 also states the properties of the multilayer film produced.

TABLE 3

|  |  | V12 | V13 | B14 | B15 | B16 |
|---|---|---|---|---|---|---|
| Makeup |  | FP-2 // FP-4 // P-2 // FP-6 // P-2 // FP-4 // FP-2 | FP-2 // FP-4 // P-4 // FP-6 // P-4 // FP-4 // FP-2 | FP-2 // FP-4 // C-1 // FP-6 // C-1 // FF-4 // FP-2 | FP-2 // FP-4 // C-2 // FP-6 // C-2 // FP-4 // FP-2 | FP-2 // FP4 // C-3 // FP-6 // C-3 // FP4 // FP-2 |
| Component (B) | [% by wt.] | — | — | 10.5 | 20.8 | 30.3 |
| Tear propagation resistance (MD) | [mN] | 3649 (8N pendulum) | 4344 (8N pendulum) | 4257 (8Npendulum) | 13206 (32N pendulum) | 11311 (32N pendulum) |
| Tear propagation resistance (TD) | [mN] | 3909 (8N pendulum) | 8812 (32N pendulum) | 6667 (32N pendulum) | 17953 (8Npendulum) | 14408 (32N pendulum) |
| Modulus of elasticity (MD) | [MPa] | 717 | 629 | 723 | 698 | 628 |
| Modulus of elasticity (TD) | [MPa] | 721 | 650 | 721 | 679 | 681 |

Production of Monofilms by the Blowing Process

Monofilms were produced in a 7-layer blown film system from Collin® having a die head diameter of 180 mm. Of the 7 extruders, 6 had a diameter of 30 mm (extruders B, C, D, E, F, G) and one a diameter of 45 mm (extruder A). The melt from extruder was on the inside of the bubble; the melt from extruder G was on the outside. The sequence of the layers, from the inside outward, was A, B, C, D, E, F, G. The monofilms produced had a thickness of 100 μm and the layers had a layer thickness of 15/14/14/14/14/14/15 μm in the monofilms. All the extruders were loaded with the same component. The films were slit before they were wound up.

The components used and the properties of the monomaterial films are specified in table 4. The percentages by weight of component (B) specified in table 4 are understood to mean the percentages by weight of units derived from component (B) (polyamide-6,36 units) in the copolyamide, based on the total weight of the copolyamide.

TABLE 4

| Component |  | V17 P-1 | V18 P-3 | V19 FP-2 | B20 C-1 | B21 C-2 | B22 C-3 |
|---|---|---|---|---|---|---|---|
| Component (B) | [% by wt.] | — | — | — | 10.5 | 20.8 | 30.3 |
| Tear propagation resistance (MD) | [mN] | 1913 (8N pendulum) | 4783 (8N pendulum) | 2917 (8N pendulum) | 3083 (8N pendulum) | 3804 (32N pendulum) | 9548 (32N pendulum) |

TABLE 4-continued

| Component | | V17 P-1 | V18 P-3 | V19 FP-2 | B20 C-1 | B21 C-2 | B22 C-3 |
|---|---|---|---|---|---|---|---|
| Tear propagation resistance (TD) | [mN] | 1823 (8N pendulum) | 5325 (8N pendulum) | 5638 (8N pendulum) | 2909 (8N pendulum) | 5767 (8N pendulum) | 22287 (8N pendulum) |
| Puncture energy (50% AH) | [J] | 5.7 | 6.0 | 0.6 | 6.1 | 7.3 | 5.7 |
| Modulus of elasticity (MD) | [MPa] | 635 | 411 | 188 | 536 | 412 | 329 |
| Modulus of elasticity (TD) | [MPa] | 656 | 410 | 187 | 510 | 446 | 356 |
| Stability in 25% sulfuric acid | | O | X | | O | O | O |

Production of Multilayer Films in a Blowing Process

Multilayer films comprising three different materials were produced in a 7-layer blown film system from Collin® with a die head diameter of 180 mm. Of the 7 extruders, 6 had a diameter of 30 mm and one a diameter of 45 mm. The multilayer films obtained had a thickness of 100 μm and the layers had a layer thickness, of 15/14/14/14/14/15 μm. The extruders of the blown film system were charged with the components in accordance with the makeup of the multilayer films specified in table 5. Table 5 also states the properties of the multilayer films produced. The percentages by weight of component (B) specified in table 5 are understood to mean the percentages by weight of units derived from component (B) (polyamide-6,36 units) in the copolyamide, based on the total weight of the copolyamide.

TABLE 5

| | | V23 | V24 | B25 | B26 | B27 |
|---|---|---|---|---|---|---|
| Makeup | | FP-1 // FP-3 // P-1 // P-1 // P-1 // FP-3 // FP-1 | FP-1 // FP-3 // P-3 // P-3 // P-3 // FP-3 // FP-1 | FP-1 // FP-3 // C-1 // C-1 // C-1 // FP-3 // FP-1 | FP-1 // FP-3 // C-2 // C-2 // C-2 // FP-3 // FP-1 | FP-1 // FP-3 // C-3 // C-3 // C-3 // FP-3 // FP-1 |
| Component (B) | [% by wt.] | — | — | 10.5 | 20.8 | 30.3 |
| Tear propagation resistance (MD) | [mN] | 1461 (8N pendulum) | 2826 (8N pendulum) | 1950 (8N pendulum) | 3109 (8N pendulum) | 5181 (8N pendulum) |
| Tear propagation resistance (TD) | [mN] | 1461 (8N pendulum) | 2824 (8N pendulum) | 2122 (8N pendulum) | 3468 (8N pendulum) | 4318 (8N pendulum) |
| Puncture energy | [J] | 1.3 | 0.6 | 1.3 | 3.7 | 4.0 |
| Modulus of elasticity (MD) | [MPa] | 377 | 312 | 321 | 316 | 280 |
| Modulus of elasticity (TD) | [MPa] | 391 | 307 | 356 | 326 | 307 |

Production of Multilayer Films in a Blowing Process

Multilayer films comprising five different polymers were produced in a 7-layer blown film system from Collin® with a die head diameter of 180 mm. Of the 7 extruders, 6 had a diameter of 30 mm and one a diameter of 45 mm. The multilayer films obtained had a thickness of 100 μm and the layers had a layer thickness of 15/14/14/14/14/15 μm. The extruders of the blown film system were charged with the components in accordance with the makeup of the multilayer films specified in table 6. Table 6 also states the properties of the multilayer films produced. The percentages by weight of component (B) specified in table 6 are understood to mean the percentages by weight of units derived from component (B) (polyamide-6,36 units) in the copolyamide, based on the total weight of the copolyamide.

TABLE 6

| | | V28 | V29 | B30 | B31 | B32 |
|---|---|---|---|---|---|---|
| Makeup | | FP-1 // FP-3 // P-1 // FP-5 // P-1 // FP-3 // FP-1 | FP-1 // FP-3 // P-3 // FP-5 // P-3 // FP-3 // FP-1 | FP-1 // FP-3 // C-1 // FP-5 // C-1 // FP-3 // FP-1 | FP-1 // FP-3 // C-2 // FP-5 // C-2 // FP-3 // FP-1 | FP-1 // FP-3 // C-3 // FP-5 // C-3 // FP-3 // FP-1 |
| Component (B) | [% by wt.] | — | — | 10.5 | 20.8 | 30.3 |

TABLE 6-continued

|  |  | V28 | V29 | B30 | B31 | B32 |
|---|---|---|---|---|---|---|
| Tear propagation resistance (MD) | [mN] | 1975 (8N pendulum) | 6401 (32N pendulum) | 1875 (8N pendulum) | 6194 (32N pendulum) | 10042 (32N pendulum) |
| Tear propagation resistance (TD) | [mN] | 2325 (8N pendulum) | 8062 (8N pendulum) | 1975 (8N pendulum) | 9637 (8N pendulum) | 13530 (8N pendulum) |
| Puncture energy | [J] | 0.7 | 0.8 | 1.2 | 1.2 | 0.9 |
| Modulus of elasticity (MD) | [MPa] | 814 | 709 | 878 | 778 | 714 |
| Modulus of elasticity (TD) | [MPa] | 793 | 710 | 421 | 672 | 593 |

Production of Monofilms in the Blowing Process

Monofilms were produced in a 7-layer blown film system from Collin® with a die head diameter of 180 mm. Of the 7 extruders, 6 had a diameter of 30 mm and one a diameter of 45 mm. The monomaterial films produced had a thickness of 100 μm and the layers had a layer thickness of 15/14/14/14/14/14/15 μm. All the extruders were loaded with the same component.

The components used and the properties of the monofilms are specified in table 7. The percentages by weight of component (B) specified in table 7 are understood to mean the percentages by weight of units derived from component (B) (polyamide-6,36 units) in the copolyamide, based on the total weight of the copolyamide.

TABLE 7

|  |  | V33 | V34 | B35 |
|---|---|---|---|---|
| Component |  | P-1 | P-3 | O-4 |
| Component (B) | [% by wt.] | — | — | 28.9 |
| Tear propagation resistance (MD) | [mN] | 1910 (8N pendulum) | 4408 (8N pendulum) | 8654 (32N pendulum) |
| Tear propagation resistance (TD) | [mN] | 1736 (8N pendulum) | 4057 (8N pendulum) | 11436 (32N pendulum) |
| Modulus of elasticity (MD) | [MPa] | 666 | 484 | 297 |
| Modulus of elasticity (TD) | [MPa] | 678 | 457 | 299 |

Production of Multilayer Films in the Blowing Process

Multilayer films were produced in a 7-layer blown film system from Collin® with a die head diameter of 180 mm. Of the 7 extruders, 6 had a diameter of 30 mm and one a diameter of 45 mm. The monomaterial films produced had a thickness of 100 μm and the layers had a layer thickness of 15/14/14/14/14/14/15 μm. All the extruders were loaded with the same component.

The components used and the properties of the monomaterial films are specified in table 8. The percentages by weight of component (B) specified in table 8 are understood to mean the percentages by weight of units derived from component (B) (polyamide-6,36 units) in the copolyamide, based on the total weight of the copolyamide.

TABLE 8

|  |  | V36 | V37 | B38 |
|---|---|---|---|---|
| Makeup |  | FP-1 // FP-3 // P-1 // FP-5 // P-1 // FP-3 // FP-1 | FP-1 // FP-3 // P-3 // FP-5 // P-3 // FP-3 // FP-1 | FP-1 // FP-3 // C-4 // FP-5 // C-4 // FP-3 // FP-1 |
| Component (B) | [% by wt.] | — | — | 28.9 |
| Tear propagation resistance (MD) | [mN] | 1932 (8N pendulum) | 3079 (32N pendulum) | 15149 (32N pendulum) |
| Tear propagation resistance (TD) | [mN] | 2276 (8N pendulum) | 6124 (8N pendulum) | 10110 (32N pendulum) |
| Modulus of elasticity (MD) | [MPa] | 990 | 824 | 746 |
| Modulus of elasticity (TD) | [MPa] | 966 | 784 | 728 |

The above examples show that the copolyamide of the invention can significantly increase the tear propagation resistance of the agricultural films (AF) both in extrusion direction and at right angles thereto. The modulus of elasticity and puncture resistance of the agricultural films (AF) of the invention are also within a range acceptable for practical use, and so the agricultural films (AF) of the invention have advantageous properties overall, especially for use in the agricultural sector.

The invention claimed is:

1. An agricultural film comprising: at least one copolyamide prepared by polymerizing the following components:
   (A) 60% to 80% by weight of at least one lactam, and
   (B) 20% to 40% by weight of a monomer mixture (M) comprising the following components:
      (B1) at least one $C_{32}$-$C_{40}$ dimer acid, and
      (B2) at least one $C_4$-$C_{12}$ diamine,
   wherein:
      percentages by weight of components (A) and (B) are each based on the sum total of the percentages by weight of components (A) and (B); and
      the copolyamide has a viscosity number of from 212 to 280 ml/g, determined in a 0.5% by weight solution of the copolyamide in a mixture of phenol/o-dichlorobenzene in a weight ratio of 1:1.

2. The agricultural film according to claim 1, wherein component (A) is selected from the group consisting of 3-aminopropanolactam, 4-aminobutanolactam, 5-aminopentanolactam, 6-aminohexanolactam, 7-aminoheptanolactam, 8-aminooctanolactam, 9-aminononanolactam, 10-aminodecanolactam, 11-aminoundecanolactam, and 12-aminododecanolactam.

3. The agricultural film according to claim 1, wherein component (B) comprises:

from 45 to 55 mol % of component (B1), and
from 45 to 55 mol % of component (B2), based in each case on the total molar amount of component (B).

4. The agricultural film according to claim 1, wherein component (B2) is selected from the group consisting of tetramethylenediamine, pentamethylenediamine, hexamethylenediamine, decamethylenediamine, and dodecamethylenediamine.

5. The agricultural film according to claim 1, wherein component (B1) is prepared proceeding from at least one unsaturated fatty acid selected from the group consisting of an unsaturated $C_{16}$ fatty acid, an unsaturated $C_{18}$ fatty acid and an unsaturated $C_{20}$ fatty acid.

6. The agricultural film according to claim 1, wherein the copolyamide has a glass transition temperature of from 20 to 50° C.

7. The agricultural film according to claim 1, wherein the copolyamide has a melting temperature of from 150 to 215° C.

8. The agricultural film according to claim 1, wherein the agricultural film comprises at least one first layer comprising the at least one copolyamide, and at least one additional layer,
wherein the at least one additional layer comprises at least one-further polymer (FP) selected from the group consisting of a polyolefin, a poly(ethylene-vinyl alcohol), a poly(ethylene-vinyl acetate), a polyethylene terephthalate, a polyvinylidene chloride, and a maleic anhydride-grafted polyolefin.

9. The agricultural film according to claim 1, wherein the agricultural film is produced in a casting process or in a blowing process.

10. He agricultural film according to claim 1, wherein the agricultural film has a thickness of from 0.1 μm to 1 mm.

11. The agricultural film according to claim 1, wherein the copolyamide is a random copolymer.

12. The agricultural film according to claim 1, wherein the agricultural film is selected from the group consisting of a silage film, a mulch film and a greenhouse film.

13. A process for producing the agricultural film according to claim 1, comprising:
i) providing at least one copolyamide prepared by polymerizing the following components: (A) 60% to 80% by weight of at least one lactam, (B) 20% to 40% by weight of a monomer mixture (M) comprising the following components: (B1) at least one $C_{32}$-$C_{40}$ dimer acid and (B2) at least one $C_4$-$C_{12}$ diamine, where the percentages by weight of components (A) and (B) are each based on the sum total of the percentages by weight of components (A) and (B), in molten form in a first extruder,
ii) extruding the at least one copolyamide in molten form provided in step i) out of the first extruder through a die to obtain a film of the at least one copolyamide in molten form, iii) cooling the film obtained in step ii) with solidification of the at least one copolyamide to obtain the agricultural film.

14. A film comprising the agricultural film according to claim 1.

15. A film comprising the agricultural film according to claim 1, wherein the film is a silage film, a mulch film, a greenhouse film or a silo film.

16. The agricultural film according to claim 1, wherein:
the monomer mixture (M) optionally further comprises (B3) at least one $C_4$-$C_{20}$ diacid; and
the copolyamide is free from monomer units other than those from components (A), (B1), (B2), and (B3).

* * * * *